(12) United States Patent
Regupathy et al.

(10) Patent No.: US 11,816,220 B2
(45) Date of Patent: Nov. 14, 2023

(54) PHASED BOOT PROCESS TO DYNAMICALLY INITIALIZE DEVICES IN A VERIFIED ENVIRONMENT

(71) Applicant: Intel Corporation, Santa Clara, CA (US)

(72) Inventors: Rajaram Regupathy, Bangalore (IN);
Subrata Banik, Bangalore (IN);
Vincent Zimmer, Issaquah, WA (US);
Saranya Gopal, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 370 days.

(21) Appl. No.: 17/032,369

(22) Filed: Sep. 25, 2020

(65) Prior Publication Data
US 2021/0019420 A1 Jan. 21, 2021

(51) Int. Cl.
*G06F 21/57* (2013.01)
*G06F 21/79* (2013.01)

(52) U.S. Cl.
CPC .......... *G06F 21/575* (2013.01); *G06F 21/572* (2013.01); *G06F 21/79* (2013.01)

(58) Field of Classification Search
CPC ...... G06F 21/575; G06F 21/572; G06F 21/07; G06F 21/79
See application file for complete search history.

(56) References Cited

U.S. PATENT DOCUMENTS

| 8,255,594 B2 | 8/2012 | De et al. |
| 9,298,524 B2 | 3/2016 | Lewis |
| 9,575,791 B2 | 2/2017 | Martinez et al. |

(Continued)

FOREIGN PATENT DOCUMENTS

WO  2022066301 A1  3/2022

OTHER PUBLICATIONS

Notification Concerning the Availability of the Publication of the International Application for International Application No. PCT/US2021/044997 dated Mar. 31, 2022, 1 page.

(Continued)

*Primary Examiner* — Daniel B Potratz
(74) *Attorney, Agent, or Firm* — Jaffery Watson; MENDONSA & HAMILTON LLP

(57) ABSTRACT

Embodiments are directed to a phased boot process to dynamically initialize devices in a verified environment. An embodiment of a system includes a memory device to store platform initialization firmware to cause the processing system to: initialize, during a boot process, a portion of the one or more memory modules as system management random access memory (SMRAM) for system management mode (SMM) usage; generate an SMM component in the SMRAM, the SMM component comprising an SMM handler routine to handle dynamic intellectual property (IP) management operations corresponding to the plurality of hardware components; register the SMM handler routine with an SMM interrupt (SMI) for identification of SMM events from an operating system (OS); and generate an SMM dispatcher in the SMRAM, the SMM dispatcher to create an instance of the SMM handler routine in the SMRAM in response to receiving an SMI from the OS during runtime of the processing system.

19 Claims, 9 Drawing Sheets

(56) References Cited

U.S. PATENT DOCUMENTS

| | | | |
|---|---|---|---|
| 2005/0114639 A1* | 5/2005 | Zimmer | G06F 9/4401 |
| | | | 712/244 |
| 2009/0119748 A1 | 5/2009 | Yao et al. | |
| 2015/0370661 A1* | 12/2015 | Swanson | G06F 13/4027 |
| | | | 714/4.11 |
| 2016/0070932 A1* | 3/2016 | Zimmer | G06F 21/53 |
| | | | 713/192 |
| 2017/0140153 A1 | 5/2017 | Zimmer et al. | |
| 2018/0285291 A1* | 10/2018 | Schulz | G06F 13/24 |
| 2019/0228157 A1* | 7/2019 | Tang | G06F 21/554 |

OTHER PUBLICATIONS

Hongliang Liang et al: "Aurora: Providing Trusted System Services for Enclaves on an Untrusted System", arxiv.org, Cornell University Library, 201 Olin Library Cornell University Ithaca, NY 14853, Feb. 10, 2018.

International Search Report & Written Opinion for International Application No. PCT/US2021/044997 dated Nov. 8, 2021, 17 pages.

International Preliminary Report on Patentability for International Application No. PCT/US2021/044997 dated Apr. 6, 2023, 11 pages.

\* cited by examiner

700

---

Power on a system including a plurality of processor cores coupled to a plurality of hardware components
705

↓

Initialize a portion of one or more memory modules as system management RAM (SMRAM) for system management mode (SMM) usage
710

↓

Generate an SMM component in the SMRAM, the SMM component including an SMM handler routine to handle dynamics IP management operations corresponding to a plurality of hardware components
715

↓

Register the SMM handler routine with an SMM interrupt (SMI) for identification of SMM events from an operation system (OS)
720

↓

Generate an SMM dispatcher in the SMRAM, the SMM dispatcher to create an instance of the SMM handler routine in the SMRAM in response to receiving an SMI from the OS during runtime of the system
725

Receive, at an application executing in a rest of the execution environment (REE) of an OS, an external event associated with a hardware device during runtime of a system
755

↓

Utilize, by an application driver of the application, a trusted execution environment (TEE) application programming interface (API) to communicate a request from the REE to a trusted OS component in the TEE
760

↓

Verify the request at the trusted OS component in the TEE
765

↓

Generate system management mode (SMM) interrupt (SMI) corresponding to the event to initiate communication between the trusted OS component and trusted firmware
770

↓

Invoke, in response to the SMI, an SMM handler routine in SMRAM to communicate with the hardware device
775

↓

Perform, via the SMM handler routine, management of the hardware device including at least one of enabling or disabling the hardware device during the runtime of the system
780

PHASED BOOT PROCESS TO DYNAMICALLY INITIALIZE DEVICES IN A VERIFIED ENVIRONMENT

BACKGROUND

A processing system may include hardware and software components. The software components may include one or more applications, an operating system (OS), and firmware. The applications may include control logic for performing the work that is of value to the user of the processing system. In the processing system, the applications run on top of the OS, which runs at a lower logical level than the applications (i.e., closer to the hardware) to provide an underlying environment or abstraction layer that makes it easier to create and execute the applications. The firmware runs at an even lower logical level to provide an underlying environment or abstraction layers which makes it easier to create and execute the OS. For instance, the firmware may establish a basic input/output system (BIOS), and the OS may use that BIOS to communicate with different hardware component within the processing system.

Typically, the OS and the applications execute out of random-access memory (RAM), which is volatile. Some or all of the firmware may also execute out of RAM. However, since the RAM is volatile, the environment for performing useful work basically disappears whenever the processing system is turned off. Consequently, whenever the processing system is turned on, the processing system should recreate that environment before useful work can be performed. For purposes of this disclosure, the operations for preparing a processing system to execute an OS may be referred to as the "boot process." Similarly, the time that elapses during the boot process may be referred to as the "boot time."

BRIEF DESCRIPTION OF THE DRAWINGS

Embodiments described here are illustrated by way of example, and not by way of limitation, in the figures of the accompanying drawings in which like reference numerals refer to similar elements.

FIG. 7A is a flow diagram illustrating operations for providing a phased boot process to dynamically initialize devices in a verified environment, according to implementations of the disclosure.

FIG. 7B is a flow diagram illustrating operations for dynamically initializing a device during runtime in a verified environment, according to implementations of the disclosure.

DETAILED DESCRIPTION

Figure 1:
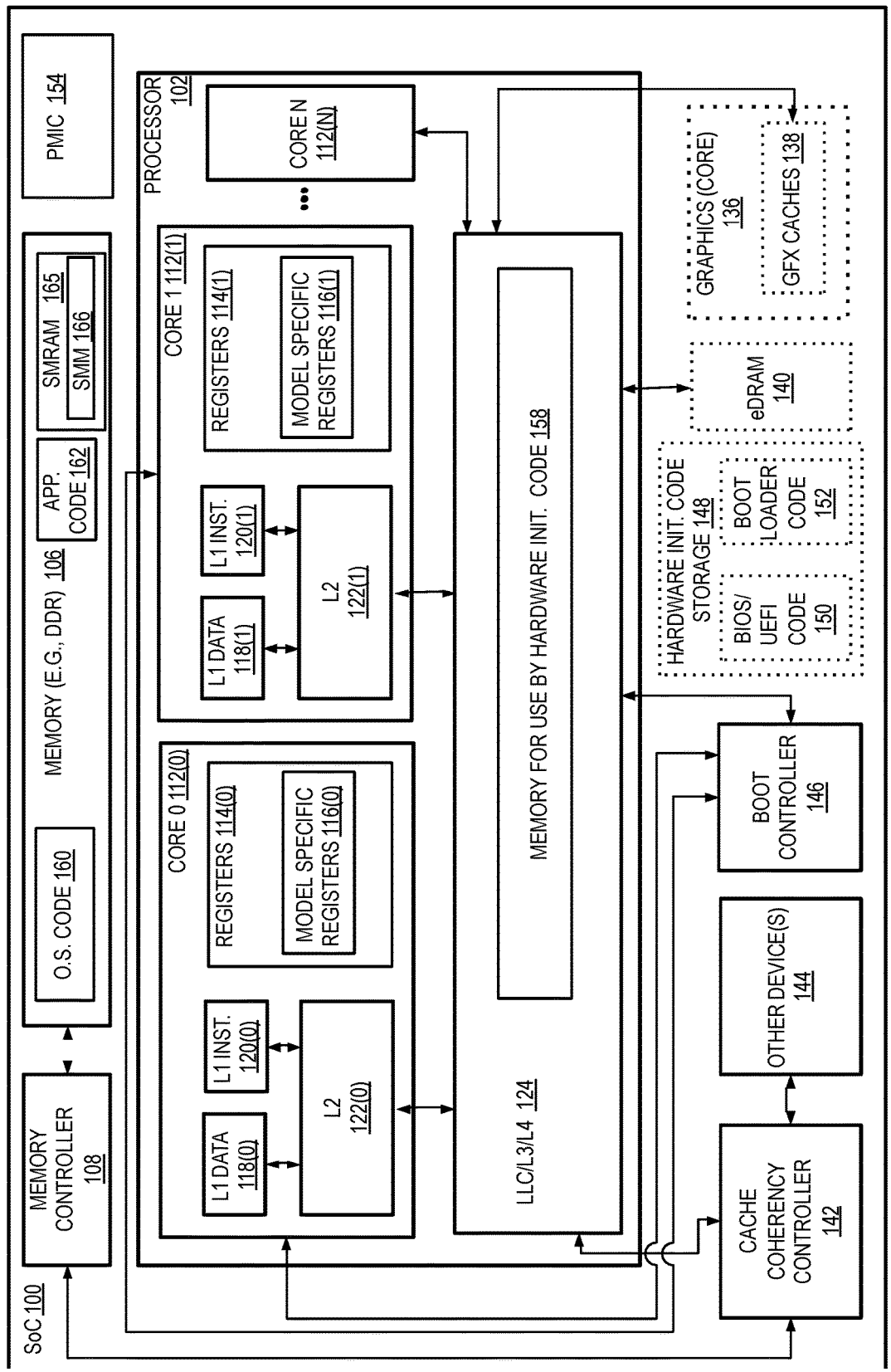
FIG. 1 illustrates a system on a chip (SoC) to provide a phased boot process to dynamically initialize devices in a verified environment, according to implementations of the disclosure.

Embodiments described herein are directed a phased boot process to dynamically initialize devices in a verified environment.

As indicated above, when a processing system is turned on or reset, the processing system may execute a boot process before the processing system can be utilized for work. As discussed herein, the operations for preparing a processing system to execute an OS may be referred to as the "boot process." Similarly, the time that elapses during the boot process may be referred to as the "boot time." The control logic or firmware that performs or controls the boot process may be referred to as the "system firmware," the "system bootcode," the "platform bootcode," or simply the "bootcode."

In conventional computing systems, such as a System-on-a-Chip (SoC), there are various platform components (also referred to herein as platform devices) that are enabled during the boot process. Platform components may refer to components that implement hardware functionality in a computing system and can include, but are not limited to, Universal Asynchronous Receiver/Transmitter (UART), Ethernet controllers, media access controllers (MACs), Peripheral Component Interconnect (PCI), PCI-express (PCI-E), processor units, power modules, USB modules, memory modules, and so on. The hardware circuit that is the basic building block of the platform component design and that is integrated into a system processing chip's core logic is referred to herein as semiconductor intellectual property (IP), or just simply as an "IP" or "IP block" herein.

In conventional computing systems, IPs for the computing system (e.g., SoC) are enabled during the boot process. This is because, in conventional systems, there is no way to enable/disable these IPs dynamically in a verified environment based on functional uses of the operating system (OS) during runtime. However, enabling all IPs of platform components during the boot process can be costly and inefficient in terms of power, boot speed, and/or authentication, for example. For example, when an IP is statically enabled it remains in an ON or Active state (e.g., device states such as D0-D3), even when the platform component is not utilized. As a result, the platform component can leak system power and impact system performance. Thus, a technical problem of conventional systems is a lack of an ability to dynamically manage (e.g., enable and/or disable) platform devices in a secure manner to enhance power conservation and provide a better user experience.

In some previous solutions, IPs were enabled through hardware initialization code (e.g., Basic Input/Output System (BIOS) code) during the boot process itself. If a static 'acceptable device list' is maintained by an operating system to enable only the trusted devices, it still poses a security threat where a malicious peripheral can expose false configurations to bypass the acceptable device list. In some prior solutions, OS's maintained an acceptable device list of trusted devices that was used to enable a device, such as a PCIe device, that can be "plugged" via an extension. However, such acceptable device list devices are generally not relevant to the OS boot mode and are made available to the OS. Thus, dynamically enabling and/or disabling functional IPs that are not utilized all the time by the computing system can help conserve power and reduce boot time.

Implementations of the disclosure provide for a phased boot process with dynamic enabling of IPs through a Trusted Execution Environment (TEE) by OS Policy Management (OSPM). Implementations of the disclosure initially provide a secure interface using System Management Mode (SMM) from the OS TEE to enable a trusted communication path between trusted OS components and the platform hardware. Subsequently, when the interface is invoked to manage a given IP, a System Management Interrupt (SMI) is invoked to enter the trusted environment and perform the management requested by TEE.

As such, implementations of the disclosure reduce boot time and power consumption of the processing system. Specifically, implementations of the disclosure provide the option to dynamically control IP initialization in a trusted manner using a trusted BIOS/bootloader solution based on a platform use case, which helps to nullify legacy BIOS assumptions. Implementations of the disclosure also help to avoid running various I/O controller initializations, such as (but not limited to) extensible host controller interface (xHCI) for USB Camera, Bluetooth, Inter-Integrated Circuit (I2C), or serial peripheral interface (SPI) controller to enable touch functionality and display controller (e.g., display over MIPI, eDP or external devices), statically without analyzing an actual demand for utilization of such controllers during runtime of the system. Implementations of the disclosure provide for a less complex boot process initialization flow with reduced boot time. Implementations of the disclosure also provide for a secured platform design that prevents untrusted applications from being able to reach platform hardware directly from an OS layer via an untrusted third-party driver.

FIG. 1 illustrates a system on a chip (SoC) 100 to provide a phased boot process to dynamically initialize devices in a verified environment, according to implementations of the disclosure. SoC 100 includes a boot controller 146. The boot controller 146 may be located within processor 102. Depicted SoC 100 illustrates a hardware processor 102 coupled to a memory 106 via memory controller 108. In one embodiment, the memory 106 of SoC 100 is a system memory (e.g., dynamic random-access memory (DRAM)). Memory controller 108 may be included, e.g., to manage memory requests between the processor 102 and memory 106. In one embodiment, memory controller 108 is to provide (e.g., fill) data (e.g., a cache line) for a miss in the cache(s) (e.g., miss in L3 124, L4 126, or other last level cache (LLC) of processor 102).

Processor 102 may include one or more processor cores 112, e.g., 0 to N where N is a positive integer. In one embodiment, each of a plurality of processor cores have an instance of the circuitry discussed herein. Depicted core 0 112(0) includes a first level (L1) of data cache 118(0), a first level (L1) of instruction cache 120(0), and a level two (L2) cache 122(0). Depicted core 1 112(1) includes a first level (L1) of data cache 118(1), a first level (L1) of instruction cache 120(1), and a level two (L2) cache 122(1).

In some embodiments, as shown in FIG. 1, processor 102 includes one or more next levels of cache 124 (e.g., level three (L3) cache and level four (L4) cache e.g., with L4 the last level cache (LLC) (e.g., the last cache searched before a data item is fetched from memory 106) that is coupled to, and shared by, one or more (e.g., all) of the cores. In certain embodiments, each of L1 data caches 118, L1 instruction caches 120, L2 caches 122, LLC caches 124 (e.g., L3 cache and/or L4 cache) are managed by cache coherency controller 142 (e.g., circuitry), e.g., to cache data (e.g., and/or instructions) according to a specified cache coherency.

In certain embodiments, the data (e.g., and/or instructions) stored within the various processor caches are managed at the granularity of cache lines which may be a fixed size (e.g., 64, 128, 512, etc. Bytes in length). Each core 112 may include other components, for example, an instruction fetch circuit for fetching instructions (for example, from (e.g., main) memory 106 via a memory controller and/or from the caches; a decode circuit (e.g., decoder or decode unit) for decoding the instructions (e.g., decoding program instructions into micro-operations or "µops"); and an execution unit (e.g., execution circuit) for executing the decoded instructions. Core may include a writeback/retire circuit for retiring the instructions and writing back the results. Depicted core 0 112(0) further includes a set of one or more registers 114(0), for example, having one or more model specific registers 116(0), e.g., as control register(s).

SoC 100 may include one or more other devices 144, (e.g., any device to be initialized before DRAM initialization is attached with cache, such as CSME, GSPI, ESPI, etc.) that are also coupled to cache coherency controller 142. SoC 100 may include graphics circuitry 136 (e.g., a graphics core). In certain embodiments, graphics circuitry 136 includes one or more caches 138, e.g., that are coupled to one or more caches shared with the processor, e.g., L3 cache 124 and/or L4 cache 126. SoC 100 may include an embedded dynamic random-access memory 140 (eDRAM), for example, embedded into SoC 100 with processor 102. In certain embodiments, eDRAM 140 is used as L4 (e.g., LLC) cache 126 (e.g., instead of using an embedded static RAM (eSRAM) for the L4 cache). In certain embodiments, eDRAM 140 is positioned between L3 cache 124 and memory 106 (e.g., DRAM (e.g., Double Data Rate Synchronous DRAM (DDR)), e.g., on a memory bus. SoC 100 may include a power management integrated circuit 154 (PMIC), e.g., to, in response to a power on indication (e.g., pressing of a mechanical on/off switch), provide (e.g., power to the components of the SoC 100.

In certain embodiments, SoC 100 (e.g., internal or external to processor 102) includes hardware initialization code storage 148. The hardware initialization code may be hardware initialization firmware. In certain embodiments, the hardware initialization code from storage 148, when executed by the processor 102, is to cause the booting up of the SoC 100 (e.g., at least the booting up of the hardware processor 102 thereof).

In certain embodiments, the hardware initialization code is responsible for transferring control of the computer (e.g., SoC 100) to a program (e.g., OS) stored in memory coupled to the computer.

In certain embodiments, the hardware initialization code storage 148 includes BIOS and/or UEFI code from storage 150 and boot loader code from storage 152. In certain of those embodiments, the BIOS and/or UEFI (e.g., boot ROM) code is executed as a first stage, and then the boot loader code is executed as a second stage. As one example, BIOS code is according to a BIOS standard. As another example, UEFI code is according to a UEFI standard.

In certain embodiments, the BIOS and/or UEFI code brings the SoC 100 (e.g., processor 102 thereof) out of (e.g., cold) reset, puts the processor into a known and stable state, and finds the second-stage boot loader code (e.g., from storage 152) and passes control to the next stage. In one embodiment, the BIOS and/or UEFI (e.g., boot ROM) code is aware of the second-stage boot loader code 152 and not aware of any potential subsequent software stages. In certain embodiments, during this time, the BIOS and/or UEFI (e.g., boot ROM) code handles any error conditions.

In certain embodiments, the boot loader code (e.g., being passed control of the SoC (e.g., processor) when the BIOS and/or UEFI code stage is complete) then locates and loads (e.g., for execution by the processor) the next stage(s) of software (e.g., O.S.) and so on. In one embodiment, before control is passed to the boot loader code, it is decrypted and/or authenticated if secure boot is enabled.

In certain embodiments, BIOS and/or UEFI (e.g., boot ROM) code, when executed, initializes certain hardware of the SoC, checks integrity, and initializes the (e.g., first level) boot loader code. In certain embodiments, the boot loader code is, e.g., after being called at the completion of BIOS and/or UEFI (e.g., boot ROM) code execution, executed to cause a handoff of control of the SoC (e.g., processor) to the operating system executing of the SoC. In one embodiment, the boot loader code knows where (e.g., the memory location of) the OS kernel image is stored in memory, for example, and loads the OS kernel image for execution.

Although BIOS and/or UEFI (e.g., boot ROM) code storage 150 and boot loader code storage 152 are shown together, in another embodiment the BIOS and/or UEFI (e.g., boot ROM) code storage 150 is within processor 102 and the boot loader code storage 152 is separate from the processor 102 (e.g., in storage 148 of SoC 100).

In implementations of the disclosure, the boot process as provided by BIOS/UEFI code 150 is improved by providing a phased approach to enable platform security and dynamically manage (e.g., enable/disable) platform components based on, for example, user selection of OS mode switch or connected external peripherals for a better user experience. Implementations of the disclosure provide for utilization of a TEE by an OS. implementations of the disclosure initially provide a secure interface using SMM from the OS TEE to enable a trusted path between trusted OS components in the TEE and the platform hardware. In implementations of the disclosure, the BIOS and/or UEFI (e.g., boot ROM) code 150 is modified to utilize a portion of memory (e.g., DRAM-based memory) for SMM usage referred to as System Management RAM (SMRAM) 165. This SMRAM 165 stores a SMM module 166 that provides a SMM handler routine to handle dynamic IP enable/disable operations during runtime of the system. This SMM routine is invoked in implementations of the disclosure to manage a given IP during the runtime. In one implementation, an SMI is invoked to enter the trusted environment and can perform any IP management requested by TEE.

Figure 2:
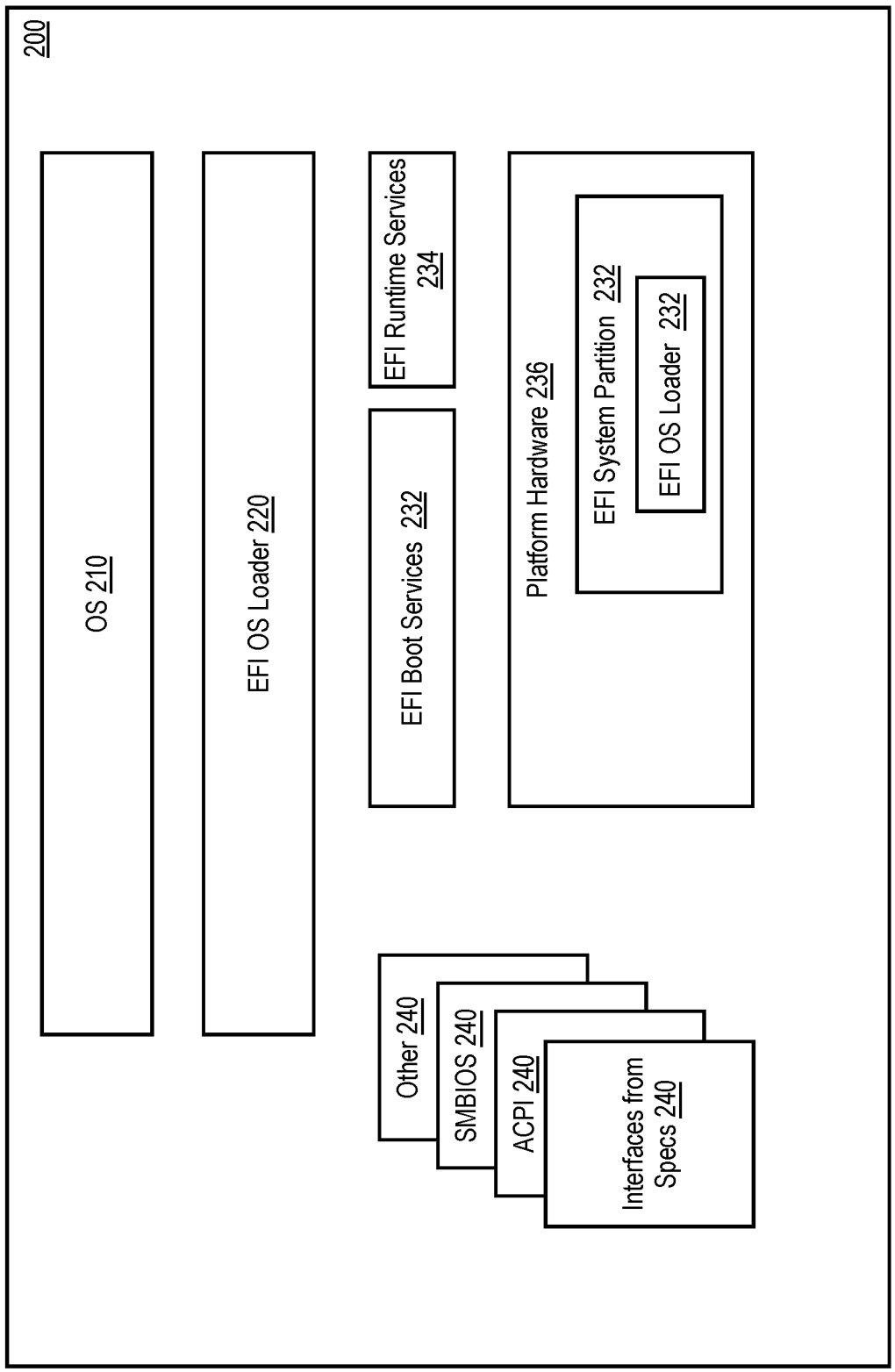
FIG. 2 illustrates an example computing environment for a boot process to boot an example operating system (OS), in accordance with implementations of the disclosure.

Implementations of the disclosure provide a way to minimize the actions of the firmware during hand-off to the OS, but have a safe runtime interface to the OS from the firmware in order to safely and/or lazily initialize devices. The trend of moving things 'out' of firmware and into the OS is laudable, especially in order to reduce the firmware trusted computing base (TCB) and boot faster. As an intermediary step, minimizing the pre-OS footprint and implementing a trusted runtime adjunct to the OS is provided by implementations of the disclosure. Turning now to FIG. 2, an example computing environment for a boot process in accordance with implementations of the disclosure is depicted.

FIG. 2 illustrates an example computing environment 200 for a boot process to boot an example OS, in accordance with implementations of the disclosure. In one implementation, computing environment 200 may be implemented by SoC 100 described with respect to FIG. 1. Computing environment 200 includes platform hardware 236 hosting extensible firmware interface (EFI) boot services 232, EFI runtime services 234, EFI OS loader 220, and OS 210. Computing environment 200 may also utilize interfaces from a variety of specifications 240 during a boot process, such as Advanced Configuration and power Interface (ACPI), System Management BIOS (SMBIOS), and others.

The Unified Extensible Firmware Interface (UEFI) Specification describes an interface between the operating system (OS) 210 and the platform firmware. The interface can be in the form of data tables that contain platform-related information, and boot and runtime service calls that are available to the OS loader 220 and the OS 210. Together, these provide a standard environment for booting an OS 210, as shown in FIG. 2.

In one implementations, the EFI boot services 232 provide interfaces for devices and system functionality that can be used during boot time and provides abstracted access to devices through handles and protocols. The EFI runtime services 234 are a minimal set of services to enable abstraction of base platform hardware 236 resources that may be utilized by the OS 210 during its normal operations. To support EFI runtime services, the computing environment 200 can use, for example, an SMM feature that provides a runtime environment that abstracts OS platform services that are to be handled by the platform firmware. The SMM mode is entered using SMI that enables the system to execute platform specific firmware, such as shown in FIG. 3.

Figure 3:
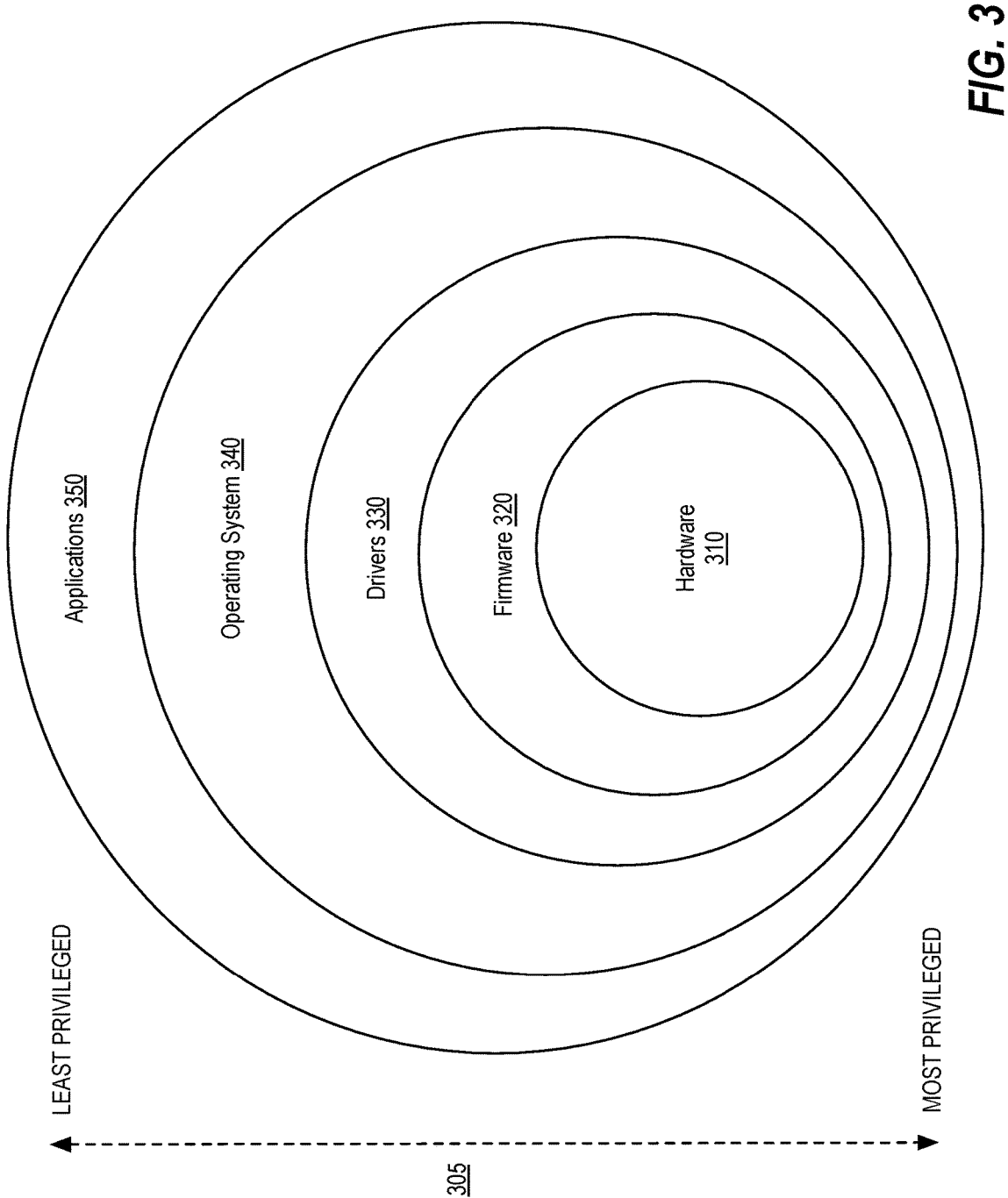
FIG. 3 illustrates a schematic illustrating a general access restriction flow between platform layers in a computing system, according to implementations of the disclosure.

FIG. 3 illustrates a schematic illustrating a general access restriction flow 300 between platform layers in a computing system, according to implementations of the disclosure. In one implementation, general access restriction flow 300 may be performed by SoC 100 described with respect to FIG. 1 and/or by computing environment 200 described with respect to FIG. 2. Platform layers may include, but are not limited to, hardware 310, firmware 320, drivers 330, kernel and OS 340, and applications 350. The general access restriction flow 300 depicted with respect to FIG. 3 can be implemented in a computing system (such as SoC 100 and/or computing environment 200) to avoid illegal or malicious applications negatively affecting hardware. The general access restriction flow 300 is shown with the platform layers 310-350 nested and depicted on a scale 305 from most privileged to least privileged, where the hardware layer 310 is the most privileged and the application layer 350 is the least privileged.

Figure 4:
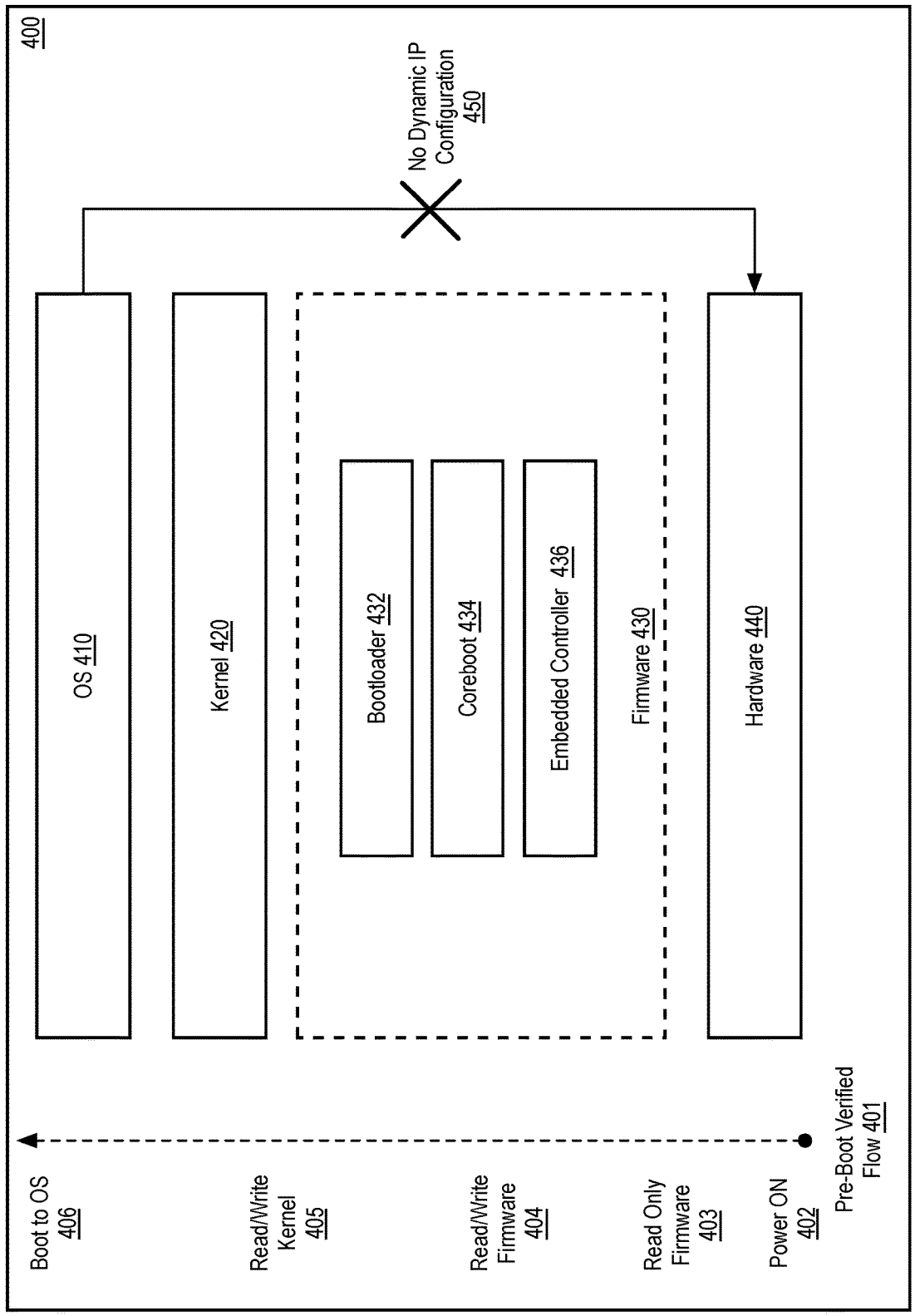
FIG. 4 illustrates a block diagram depicting a computing system performing a pre-OS verified flow and runtime implementation, in accordance with implementations of the disclosure.

FIG. 4 illustrates a block diagram depicting a computing system 400 performing a pre-OS verified flow and runtime implementation, in accordance with implementations of the disclosure. In one implementation, the computing system 400 may be the same as SoC 100 described with respect to FIG. 1 and/or computing environment 200 described with respect to FIG. 2. As shown in FIG. 4, computing system 400 includes an OS 410, kernel 420, firmware 430, and hardware 440. Computing system 400 is shown performing a pre-boot verified flow 401 in one implementation. As illustrated in the FIG. 4, the computing system 400 powers on 402 with the processor hitting reset and Host-Firmware (e.g., BIOS) 430 has started running over the processor (e.g., CPU) of hardware 440. In one implementation, firmware 430 includes bootloader 432, coreboot 434, and embedded controller (EC) 436.

Initially, a Root of Trust (ROT) lies with a Read-Only Firmware (RO) 403 section that performs basic configuration and executes Read/Write or Upgradable (RW) Firmware 404 after it verifies RW firmware. The RW firmware

404 does the majority of platform device and SoC IP initialization (programming sequencing, power management), verifies a RW kernel 405, and finally boots 406 to OS with security mechanisms. Once the computing system 400 boots to the OS 410, the verified flow 401 disappears and any communication between OS 410 and the hardware layer 440 is vulnerable for purposes of dynamic IP configuration 450. The vulnerability may be manifested in multiple areas including, but not limited to, power, boot speed, and/or authentication.

With respect to power, unlike traditional PC platforms where milliwatts of power consumption is insignificant compared to the total system power consumption while the system is in S0, for newer platforms that support connected standby, the overall system power consumption in S0 can be low where even the few milliwatts that device consumes starts to matter. To cater to such demands, methods like D3Cold are available to keep devices in the lowest possible power. However, not all devices and drivers support D3Cold and some devices are not placed D3Cold.

In one example, a client device may have two different modes of operation, including a regular mode and a developer mode. In the example, certain IPs, utilize a USB device mode functionality when the client device act as a device under test (DUT) with a debug host. In this example, a USB device mode IP is utilized in developer mode but it lies unused in a regular mode, which results in leaking power and holding system power. The above example highlights the inefficient usage and management of system resources when dynamic IP management is not implemented.

With respect to boot speed, as technology infuses different domains, improving the user experience by booting faster to the functional system has become a focus. One phase of the boot process that consumes significant time is IP initialization, as it can take ~250 ms to perform all possible IP initializations associate with an SoC. In this case, most of the IPs are not utilized in the boot phase and some of the Plug and Play (PNP) IPs may not be used when the OS boots up and may consume unnecessary power. However, to gain significant reduction of boot time and initialize and enable platform devices from the OS, a secure environment should be provided to enable platforms devices. Thus, it is logically possible to phase out the enablement of platform devices to bring in better boot time by utilizing a verified environment for seamless communication between the OSPM and the boot runtime services.

With respect to authentication, one of the challenges in new technology adoption is the vulnerability it may bring in as it matures. One example includes a USB4/TBT3 platforms support where a vulnerable situation is created through PCI and DMA-DMA devices. One of the recent vulnerability studies exposed how a gap between the BIOS and the OSPM in maintaining security levels of the TBT devices connected. Thus, methods in pre-boot protection should utilize a secure handshake of managing PNP IPs/ devices and enable them after proper authentication in the OS environment.

To address these vulnerabilities, implementations of the disclosure provide a phased approach to enable platform security and dynamically manage (e.g., enable/disable) of platform components based on user selection of OS mode switch or connected external peripherals for better user experience.

As noted above, implementations of the disclosure provide a secure interface using System Management Mode (SMM) from an OS TEE to ensure a trusted path between the trusted OS and the platform hardware. Subsequently, when the secure interface is invoked to manage a given IP, a System Management Interrupt (SMI) is invoked to enter the trusted environment and perform the IP management requested by TEE.

Figure 5:
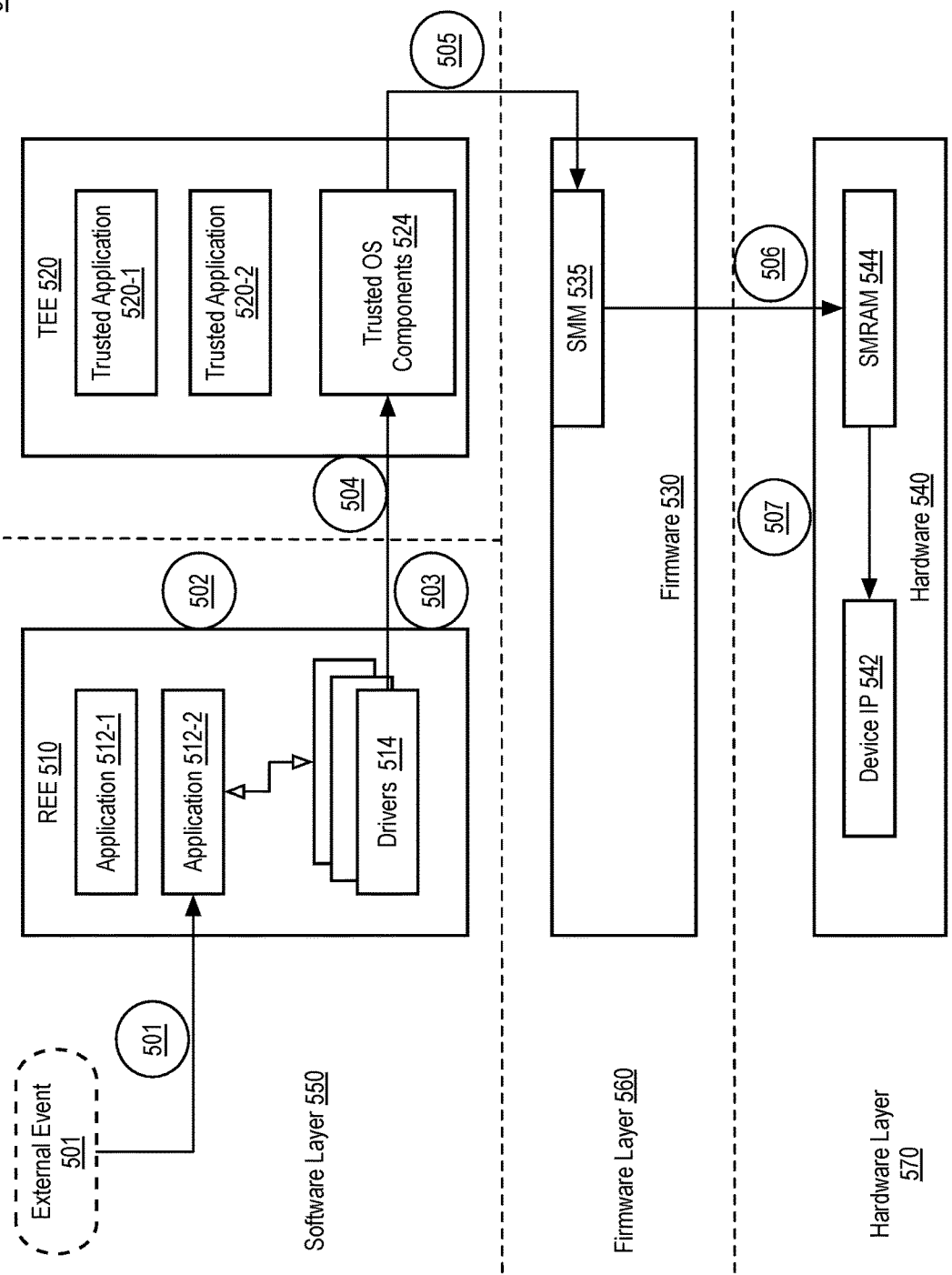
FIG. 5 illustrates a control flow of a dynamic management of semiconductor intellectual properties (IPs), in accordance with implementations of the disclosure.

FIG. 5 illustrates a control flow 500 of a dynamic management of IPs in accordance with implementations of the disclosure. In one implementation, control flow 500 may be performed by SoC 100 described with respect to FIG. 1 and/or computing environment 200 described with respect to FIG. 2. Implementations of the disclosure address dynamic enablement of SoC IPs as shown by control flow 500 using two structural changes to the design of the underlying processing system. A first structural change includes developing a Trusted Execution Environment (TEE)-based solution to ensure verified communication mechanism between an OS layer and a hardware layer. A second structural change includes using a System Management Mode (SMM) to redirect all hardware access via firmware layer to ensure access control.

Control flow 500 depicts one example of dynamically enable/disable SoC IP with an example of an external event 501 of, for example, a USB peripheral that is attached to the underlying platform. External peripherals may be attached to the underlying platform via the USB-C port and are expected to enable a controller, such as an XHCI/XDCI controller, to interface with attached device. In some implementations, this could also be a mode switch such as "Developer Mode" settings.

At 502, the external peripheral is expected to work with its own application 512-1, 512-2, which is installed on top of an OS in a software layer 550 of the underlying platform. The OS may be a pre-built OS bundle. Hence, the application 512-1, 512-2 can execute from an execution environment referred to as the rest of the execution environment (REE) 510. The REE 510 may refer to components that a user installs on top of a production OS package, such as web extensions, third-party hardware drivers, third-party applications, virtual machines, and so on. In one implementation, the REE 510 may be a virtual OS environment.

At 503, in order to develop a trusted and secure environment where the REE 510 can communicate with a trusted execution environment (TEE) 520 of the underlying platform, the third-party application 512-1, 512-2 can use an underlying third-party peripheral driver 514 to communicate with the TEE 520 using a TEE client application programming interface (API). In one implementation, the TEE may refer to all OS components that are assembled with OS package and provided by OS vendors. These OS components are also known as trusted OS components 524. The TEE 520 also includes pre-installed trusted applications 520-1, 520-2, OS drivers, and so on. In some implementations, 502 and 503 of control flow 500 may be optional depending on the use case.

At 504, an internal API of the TEE 520 may verify the communicate directed to the TEE 520 using a trusted protocol. On successful verification, the request can be forwarded to a TEE trusted driver 524 to communicate with an underlying trusted firmware layer 560.

At 505, the trusted OS component 524 (e.g., trusted OS driver) stores information about an SMI to start communication between the trusted OS component 524 and trusted firmware 530. In one implementation, during Power on Self-Test (POST), the hardware initialization code (e.g., BIOS) created an SMM infrastructure to handle the generated SMI event.

Furthermore, the hardware initialization code (e.g., BIOS) registers an SMM handler to perform hardware communications with the hardware 540 of hardware layer 570. At 506, in response to the SMI event, the SMM handler performs the hardware communications with SMRAM 544 of the hardware 540.

At 507, hardware initialization code (e.g., BIOS code) resides inside the SMRAM 544 and starts execution. The execution of the hardware initialization code inside the SMRAM 544 is used to enabled and/or disable device IPs 542 in the hardware 540.

At 507, operations are performed by the hardware initialization code in SMRAM 544 to enable an extensible host controller interface (xHCI)/xDCI controller, for example. The following example operations may be implemented to enable the xHCI/xDCI controller: Unhide Primary to Sideband Bridge (P2SB) using PCI configuration based access method [P2SBC offset 0xE0 bit 8]; Send side band interface (SBI) command to make xHCI and XDCI function enable [visible for PCI configuration space with Device register access enable]; Ensure to Lock SBI interface after execution of SBI command; and Hide the P2SB interface. As a result, control flow 500 enables the USB-based debug interface requested by OS layer.

In one implementation, the following example code snippet may be applied by the hardware initialization code in SMRAM 544 to enable an xHCI IP.

```
struct pcr_sbi_msg msg = {
    .pid = PID_XHCI, /* 0x00 - Port ID of the SBI message */
    .offset = 0, /* 0x01 - Register offset of the SBI message */
    .opcode = PCR_WRITE, /* 0x05 - Opcode */
    .is posted = false, /* 0x06 - Posted message */
    .fast_byte_enable =0xF, /* 0x07 - First Byte Enable */
    .bar = 0x0, /* 0x09 - base address */
    .fid = 0xB0 /* 0x0B - Function ID */
};
/* Bit 0: Reset to make XHCI Function disable */
uint32_t data32 = 0;
uint8_t response;
int status;
/* unhide p2sb device */
p2sb_unhide( );
/* Send SBI command to make XHCI function disable */
status = pcr_execute_sideband_msg(&msg, &data32, &response);
if (status || response)
    printk(BIOS_ERR, "Fail to make XHCI function enable\n");
/* Ensure to Lock SBI interface after this command */
p2sb_disable_sideband_access( );
/* hide p2sb device */
p2sb_hide( );
```

Figure 6:
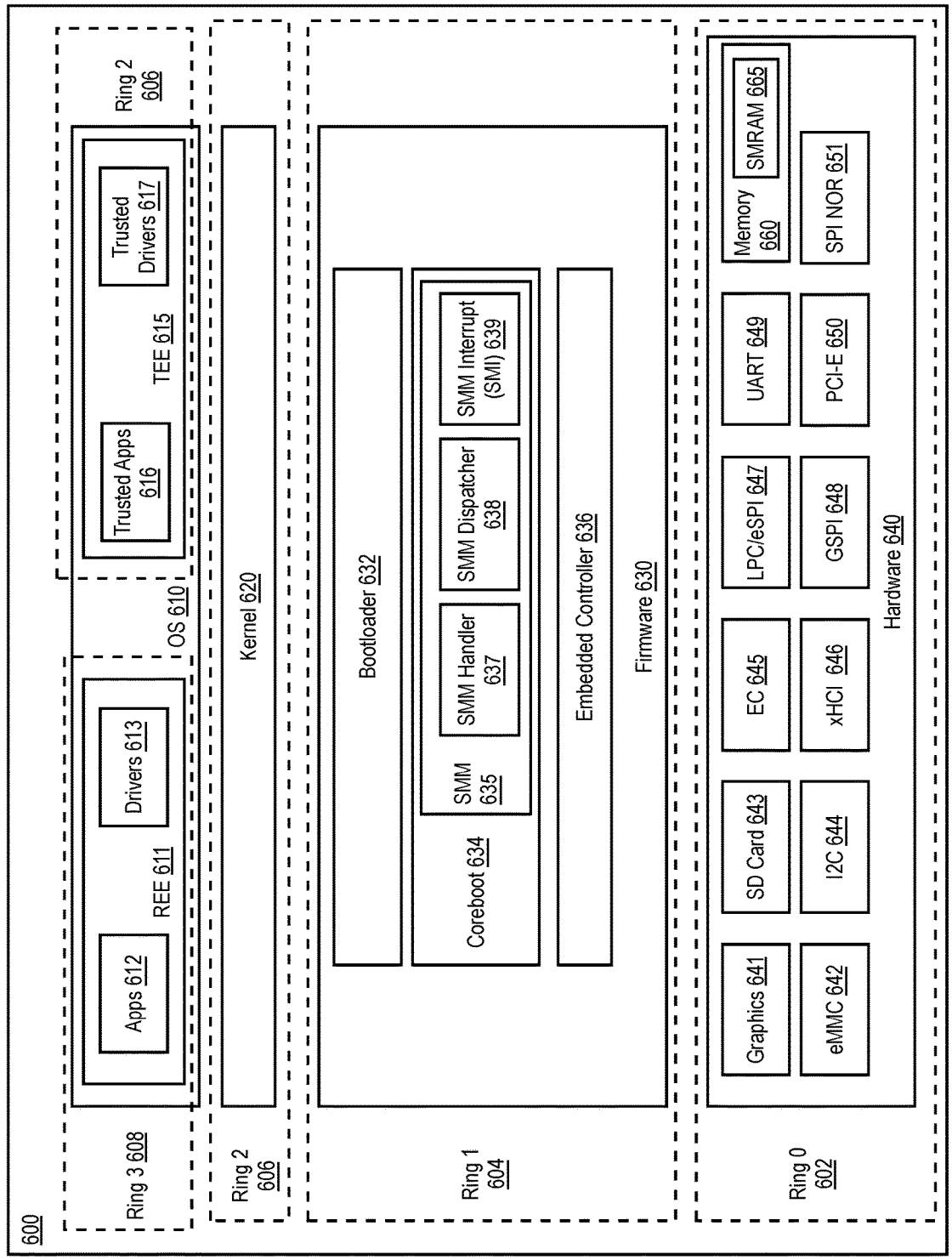
FIG. 6 illustrates a computing system performing trusted execution environment (TEE) and system management mode (SMM)-based dynamic IP management, in accordance with implementations of the disclosure

FIG. 6 illustrates a computing system 600 performing TEE and SMM-based dynamic IP management, in accordance with implementations of the disclosure. In one implementation, the computing system 600 may be the same as SoC 100 described with respect to FIG. 1 and/or computing environment 200 described with respect to FIG. 2. As shown in FIG. 6, computing system 600 includes an OS 610, kernel 620, firmware 630, and hardware 640.

The OS 610 has the least privilege (e.g., ring 3 608) to access the hardware block 640. This OS 610 layer includes OS-specific UIs (not shown), OS extensions (not shown), drivers 613, 617, and various applications 612, 616. In some examples, user-requested mode switch changes (e.g., Normal Mode to Developer Mode Switch) or attaching an external peripheral (USB4 based TBT device) may utilize access to the underlying hardware 640. As discussed above, implementations of the disclosure provide for a phased boot process to allow hardware access form the OS layer using a TEE-based solution that provides for security and trust.

To implement the TEE-based solution, the OS 610 is divided into two blocks, the REE 611 and the TEE 615. The TEE 615 includes the OS components that are assembled with the OS package and provided by OS vendors. These component are referred to as trusted OS components. The TEE 615 includes Pre-Installed applications 616, OS drivers 617, and so on. In one implementation, the TEE block 615 of OS 610 has more privilege (e.g., ring 2 606) than the REE block 611 of OS 610.

The REE 611 includes anything that a user installed on top of the production OS package. This may include Web Extensions, third-party hardware drivers 613, third-party applications 612, virtual machines, and so on.

In implementations of the disclosure, an application that has been installed in the REE 611 does not have access to platform hardware 640 unless it follows the TEE protocol to implement a TEE Client API. The TEE client API can internally communicate with TEE internal API to access Trusted OS components to gain access to platform hardware via SMM-based Firmware layer.

The kernel 620 may refer to a base stock kernel layer without any OS specific changes. The kernel 620 may have more privilege (e.g., ring 2 606) than the OS 610. The firmware 630 interfaces with hardware 640 and, as such, has more privilege (e.g., ring 1 604) compared to the Kernel 620 layer. The firmware 630 includes all platform host-firmware components such as, but not limited to, an Embedded Controller Firmware (EC) 636, BIOS/Bootloader 632, and coreboot 634.

The hardware 640 refers to a most trusted block (e.g., ring 0 602) where all hardware configuration is accessible. This hardware block 640 defines all possible hardware components like various SoC IPs (e.g., Graphics 641, Memory 660, EMMC 642, SD card 643, I2C 644, EC 645, XHCI 646, LPC/eSPI 647, GSPI 648, UART 649, PCIE 650, SPI NOR 651, etc.)

In implementations of the disclosure, to provide an option to perform dynamically IP enabling/disabling based on runtime user direction, hardware initialization code (e.g., BIOS) can define a SMM-based communication channel between the OS layer 610 and firmware 630 to perform dynamic SoC IP configurations. To define this SMM-based communication channel, hardware initialization code (e.g., BIOS) can utilize a portion of memory 660 (e.g., DRAM based memory) for SMM usage. This portion of memory is referred to as System Management RAM (SMRAM) 665. The hardware initialization code can develop a SMM BIOS module 635, which has routine (i.e., SMM Handler 637) to handle dynamic IP enable/disable operation. Hardware initialization code registers this SMM handler 637 with SMM vector known as SMM Interrupt 639 for identification of an SMM event from OS layer. Hardware initialization code also develops a SMM dispatcher 638 to install SMM BIOS module in normal mode (not in SMM) to create an instance into SMRAM memory for runtime handling.

As noted above, hardware initialization code (e.g., BIOS) can make use of a certain portion on system memory 660 reserved as SMRAM 665 for running the piece of code inside memory to perform the dynamic IP configuration based on the directives coming from the OS layer 610. SMRAM 665 may refer to memory that is carved out from system memory 660 to execute some operation when the SMI is fired and the system enters into SMM mode. This memory is not accessible in general without the firing of an SMI.

In implementations of the disclosure, during SMM mode when a valid SMI has been fired, the SMM handler 637 begins executing from SMRAM 665. As control flow is now entered inside SMM mode, a majority of SoC IP configuration can be accessible. As a result, an SBI command can be sent in order to cause an IP 641-651, 660 to be enabled/disabled. Prior to this activity, the hardware initialization code may unhide a Primary to Sideband (P2SB) device and unlock an SBI interface and finally lockdown a P2SB device upon completion of IP enabling/disabling using the sideband access to enable platform security.

FIG. 7A is a flow diagram illustrating operations 700 for providing a phased boot process to dynamically initialize devices in a verified environment, according to implementations of the disclosure. Some or all of the operations 700 (or other processes described herein, or variations, and/or combinations thereof) are performed under the control of one or more computer components configured to execute and are implemented as code (e.g., executable instructions, one or more computer programs, or one or more applications). The code is stored on a computer-readable storage medium, for example, in the form of a computer program comprising instructions executable by one or more processors. The computer-readable storage medium is non-transitory. In some embodiments, one or more (or all) of the operations 700 are performed by a boot service.

The operations 700 include, at block 705, powering on a system comprising a plurality of processor cores coupled to a plurality of hardware components. The operations 700 further include, at block 710, initializing, by hardware initialization code, a portion of one or more memory modules as SMRAM for SMM usage. The operations 700 further include, at block 715, generating an SMM component in the SMRAM. In one implementation, the SMM component includes an SMM handler routine to handle dynamic IP management operations corresponding to a plurality of hardware components.

The operations 700 further include, at block 720, registering the SMM handler routine with an SMI for identification of SMM events from an OS of the system. The operations 700 further include, at block 725, generating an SMM dispatcher in the SMRAM. In one implementation, the SMM dispatcher is to create an instance of the SMM handler routine in the SMRAM in response to receiving an SMI from the OS during runtime of the system. In one implementation, the SMI is invoked from a trusted OS component residing in a TEE portion of the OS, where the trusted OS component verifies a request related to an event (corresponding to the SMI) received from an application in an REE portion of the OS.

Some of the operations illustrated in FIG. 7A may be repeated, combined, modified or deleted where appropriate, and additional steps may also be added to the flow in various embodiments. Additionally, steps may be performed in any suitable order without departing from the scope of particular embodiments.

FIG. 7B is a flow diagram illustrating operations 750 for dynamically initializing a device during runtime in a verified environment, according to implementations of the disclosure. Some or all of the operations 750 (or other processes described herein, or variations, and/or combinations thereof) are performed under the control of one or more computer components configured to execute and are implemented as code (e.g., executable instructions, one or more computer programs, or one or more applications). The code is stored on a computer-readable storage medium, for example, in the form of a computer program comprising instructions executable by one or more processors. The computer-readable storage medium is non-transitory. In some embodiments, one or more (or all) of the operations 750 are performed by a processing system, such as an SoC.

The operations 750 include, at block 755, receiving, at an application executing in an REE of an OS, an external event associated with a hardware device during runtime of a system. The operations 750 further include, at block 760, utilizing, an application driver of the application, a TEE API to communicate a request from the REE to a trusted OS component in the TEE. The operations 750 further include, at block 765, verifying the request at the trusted OS component in the TEE.

The operations 750 further include, at block 770, generating an SMI corresponding to the vent in order to initiate communication between the trusted OS component and trusted firmware. The operations 750 further include, at block 775, invoking, in response to the SMI, an SMM handler routing in SMRAM to communicate with the hardware device. The operations 750 further include, at block 780, performing, via the SMM handler routine, management of the hardware device including at least one of enabling or disabling the hardware device during the runtime of the system.

Some of the operations illustrated in FIG. 7B may be repeated, combined, modified or deleted where appropriate, and additional steps may also be added to the flow in various embodiments. Additionally, steps may be performed in any suitable order without departing from the scope of particular embodiments.

Figure 8:
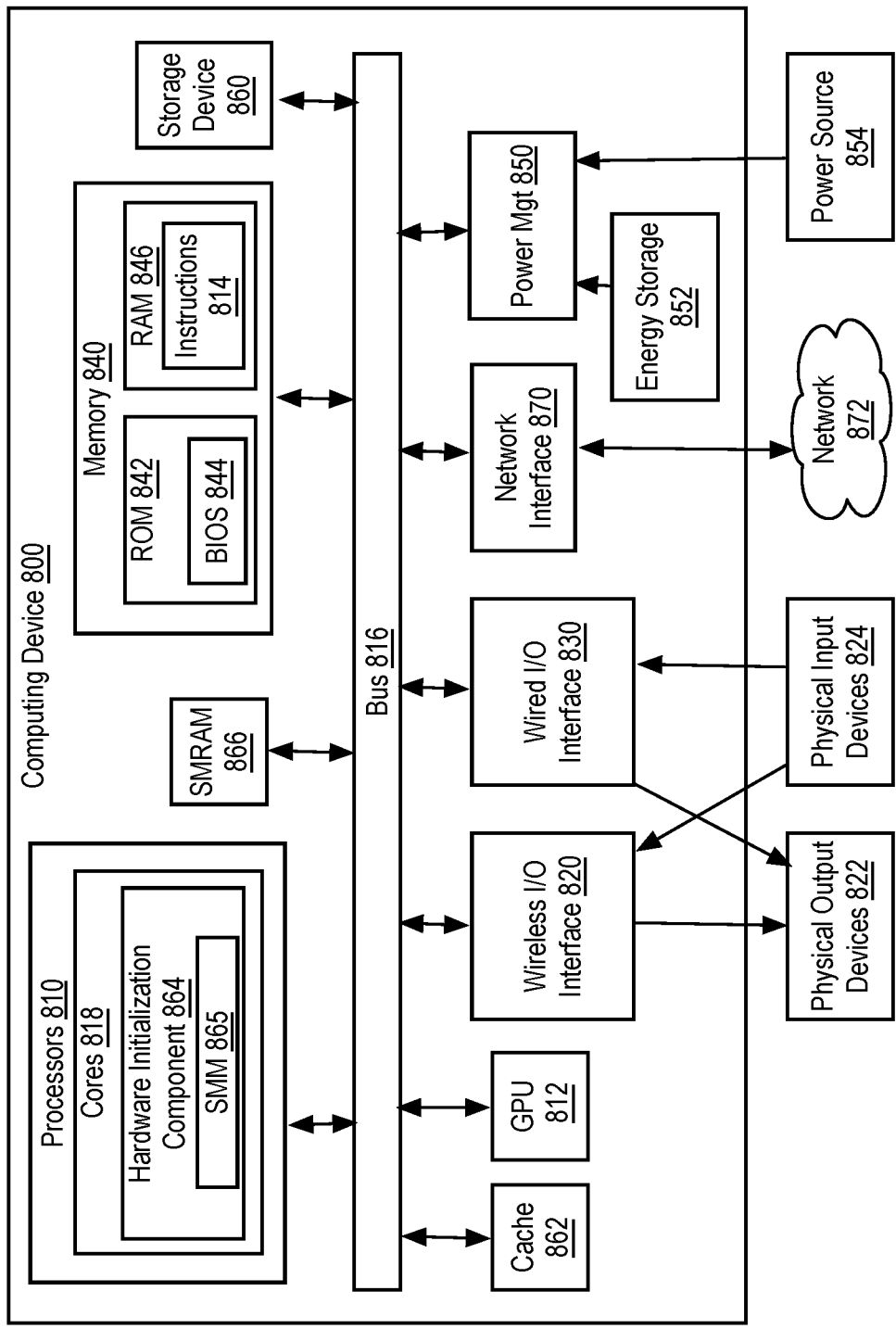
FIG. 8 is a schematic diagram of an illustrative electronic computing device to enable a phased boot process to dynamically initialize devices in a verified environment, in accordance with implementations of the disclosure.

FIG. 8 is a schematic diagram of an illustrative electronic computing device to enable i a phased boot process to dynamically initialize devices in a verified environment, according to some implementations. In some implementations, the computing device 800 includes one or more processors 810 including one or more processors dies (e.g., cores) 818 each including a hardware initialization component 864, such as a component to execute hardware initialization code, including BIOS/UEFI coder 150 and/or bootloader code 152 described with respect to FIG. 1. In some embodiments, the computing device is to provide a phased boot process to dynamically initialize devices in a verified environment using an SMM component 856 of the hardware initialization component 865 that invokes an SMM handler routine in SMRAM 866, as provided in FIGS. 1-7.

The computing device 800 may additionally include one or more of the following: cache 862, a graphical processing unit (GPU) 812 (which may be the hardware accelerator in some implementations), a wireless input/output (I/O) interface 820, a wired I/O interface 830, system memory 840 (e.g., memory circuitry), power management circuitry 850, non-transitory storage device 860, and a network interface 870 for connection to a network 872. The following discussion provides a brief, general description of the components forming the illustrative computing device 800. Example, non-limiting computing devices 800 may include a desktop computing device, blade server device, workstation, or similar device or system.

In embodiments, the processor cores 818 are capable of executing machine-readable instruction sets 814, reading data and/or instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between various system components including the processor cores 818, the cache 862, the graphics processor circuitry 812, one or more wireless I/O interfaces 820, one or more wired I/O interfaces 830, one or more storage devices 860, and/or one or more network interfaces 870. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks are not described in further detail herein, as they should be understood by those skilled in the relevant art. The bus 816 that interconnects at least some of the components of the computing device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, or similar.

The computing device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include, but are not limited to, universal serial bus (USB), IEEE 1394 ("FireWire"), and similar.

The computing device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

The computing device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

The following examples pertain to further embodiments. Example 1 is a processing system to facilitate a phased boot process to dynamically initialize devices in a verified environment. The processing system of Example 1 comprises a plurality of hardware components; one or more memory modules; and a memory device communicably coupled to the plurality of hardware components and the one or more memory modules, the memory device to store platform initialization firmware to cause the processing system to: initialize, during a boot process of the processing system, a portion of the one or more memory modules as system management random access memory (SMRAM) for system management mode (SMM) usage; generate an SMM component in the SMRAM, the SMM component comprising an SMM handler routine to handle dynamic intellectual property (IP) management operations corresponding to the plurality of hardware components; register the SMM handler routine with an SMM interrupt (SMI) for identification of SMM events from an operating system (OS) of the processing system; and generate an SMM dispatcher in the SMRAM, the SMM dispatcher to create an instance of the SMM handler routine in the SMRAM in response to receiving an SMI from the OS during runtime of the processing system.

In Example 2, the subject matter of Example 1 can optionally include wherein the hardware initialization firmware is according to a Basic Input/Output System standard. In Example 3, the subject matter of any one of Examples 1-2 can optionally include wherein the hardware initialization firmware is according to a Unified Extensible Firmware Interface standard. In Example 4, the subject matter of any one of Examples 1-3 can optionally include wherein the SMM handler routine to at least one of enable or disable an IP of one of the plurality of hardware components during the runtime of the processing system.

In Example 5, the subject matter of any one of Examples 1-4 can optionally include wherein the SMM handler routine to perform communication with the one of the plurality of hardware components to enable or disable the IP using a side band interface (SBI) command. In Example 6, the subject matter of any one of Examples 1-5 can optionally include wherein the SMM component comprises a plurality of SMM handler routines each corresponding to a hardware component of the plurality of hardware components of the processing system. In Example 7, the subject matter of any one of Examples 1-6 can optionally include wherein the SMI is received at the SMM component from a trusted execution environment (TEE) driver of the OS.

In Example 8, the subject matter of any one of Examples 1-7 can optionally include wherein components of the OS are divided into the TEE and a rest of the execution environment (REE), and wherein an application executing in the REE initiates an event to cause the SMI to be generated by the TEE driver. In Example 9, the subject matter of any one of Examples 1-8 can optionally include wherein an application driver in the REE communicates a request corresponding to the event with the TEE driver using a TEE application programming interface (API). In Example 10, the subject matter of any one of Examples 1-9 can optionally include wherein the TEE driver verifies the request using a trusted protocol of the TEE.

Example 11 is a method for facilitating a phased boot process to dynamically initialize devices in a verified environment. The method of Example 11 can optionally include initializing, during a boot process of a processing system, a portion of one or more memory modules as system management random access memory (SMRAM) for system management mode (SMM) usage; generating an SMM component in the SMRAM, the SMM component comprising an SMM handler routine to handle dynamic intellectual property (IP) management operations corresponding to a plurality of hardware components of the processing system; registering the SMM handler routine with an SMM interrupt (SMI) for identification of SMM events from an operating system (OS) of the processing system; and generating an SMM dispatcher in the SMRAM, the SMM dispatcher to create an instance of the SMM handler routine in the SMRAM in response to receiving an SMI from the OS during runtime of the processing system.

In Example 12, the subject matter of Example 11 can optionally include wherein the SMM handler routine to at least one of enable or disable an IP of one of the plurality of hardware components during the runtime of the processing system. In Example 13, the subject matter of any one of Examples 11-12 can optionally include wherein the SMM component comprises a plurality of SMM handler routines each corresponding to a hardware component of the plurality of hardware components of the processing system.

In Example 14, the subject matter of any one of Examples 11-13 can optionally include wherein the SMI is received at the SMM component from a trusted execution environment (TEE) driver of the OS, and wherein components of the OS are divided into the TEE and a rest of the execution environment (REE), and wherein an application executing in the REE initiates an event to cause the SMI to be generated by the TEE driver. In Example 15, the subject matter of any one of Examples 11-14 can optionally include wherein an application driver in the REE communicates a request corresponding to the event with the TEE driver using a TEE application programming interface (API). In Example 16, the subject matter of any one of Examples 11-15 can optionally include wherein the TEE driver verifies the request using a trusted protocol of the TEE.

Example 17 is a non-transitory computer-readable storage medium for facilitating a phased boot process to dynamically initialize devices in a verified environment. The non-transitory computer-readable storage medium of Example 17 comprises executable computer program instructions that, when executed by one or more processors, cause the one or more processors to perform operations comprising: initializing, during a boot process of a processing system comprising the one or more processors, a portion of one or more memory modules as system management random access memory (SMRAM) for system management mode (SMM) usage; generating an SMM component in the SMRAM, the SMM component comprising an SMM handler routine to handle dynamic intellectual property (IP) management operations corresponding to a plurality of hardware components of the processing system; registering the SMM handler routine with an SMM interrupt (SMI) for identification of SMM events from an operating system (OS) of the processing system; and generating an SMM dispatcher in the SMRAM, the SMM dispatcher to create an instance of the SMM handler routine in the SMRAM in response to receiving an SMI from the OS during runtime of the processing system.

In Example 18, the subject matter of Example 17 can optionally include wherein the SMM handler routine to at least one of enable or disable an IP of one of the plurality of hardware components during the runtime of the processing system. In Example 18, the subject matter of any one of Examples 17-18 can optionally include wherein the SMM component comprises a plurality of SMM handler routines each corresponding to a hardware component of the plurality of hardware components of the processing system. In Example 20, the subject matter of any one of Examples 17-19 can optionally include wherein the SMI is received at the SMM component from a trusted execution environment (TEE) driver of the OS, and wherein components of the OS are divided into the TEE and a rest of the execution environment (REE), and wherein an application executing in the REE initiates an event to cause the SMI to be generated by the TEE driver.

Example 21 is an apparatus to facilitate a phased boot process to dynamically initialize devices in a verified environment. The apparatus of Example 21 comprises a memory device to store platform initialization firmware to cause a processing system to: initialize, during a boot process of the processing system, a portion of one or more memory modules as system management random access memory (SMRAM) for system management mode (SMM) usage; generate an SMM component in the SMRAM, the SMM component comprising an SMM handler routine to handle dynamic intellectual property (IP) management operations corresponding to a plurality of hardware components of the processing system; register the SMM handler routine with an SMM interrupt (SMI) for identification of SMM events from an operating system (OS) of the processing system; and generate an SMM dispatcher in the SMRAM, the SMM dispatcher to create an instance of the SMM handler routine in the SMRAM in response to receiving an SMI from the OS during runtime of the processing system.

In Example 22, the subject matter of Example 21 can optionally include wherein the hardware initialization firmware is according to a Basic Input/Output System standard. In Example 3, the subject matter of any one of Examples 21-22 can optionally include wherein the hardware initialization firmware is according to a Unified Extensible Firmware Interface standard. In Example 24, the subject matter of any one of Examples 21-23 can optionally include wherein the SMM handler routine to at least one of enable or disable an IP of one of the plurality of hardware components during the runtime of the processing system.

In Example 25, the subject matter of any one of Examples 21-24 can optionally include wherein the SMM handler routine to perform communication with the one of the plurality of hardware components to enable or disable the IP using a side band interface (SBI) command. In Example 26, the subject matter of any one of Examples 21-25 can optionally include wherein the SMM component comprises a plurality of SMM handler routines each corresponding to a hardware component of the plurality of hardware components of the processing system. In Example 27, the subject matter of any one of Examples 21-26 can optionally include wherein the SMI is received at the SMM component from a trusted execution environment (TEE) driver of the OS.

In Example 28, the subject matter of any one of Examples 21-27 can optionally include wherein components of the OS are divided into the TEE and a rest of the execution environment (REE), and wherein an application executing in the REE initiates an event to cause the SMI to be generated by the TEE driver. In Example 29, the subject matter of any one of Examples 21-28 can optionally include wherein an application driver in the REE communicates a request corresponding to the event with the TEE driver using a TEE application programming interface (API). In Example 30, the subject matter of any one of Examples 21-29 can optionally include wherein the TEE driver verifies the request using a trusted protocol of the TEE.

Example 31 is an apparatus for facilitating a phased boot process to dynamically initialize devices in a verified environment, according to implementations of the disclosure. The apparatus of Example 31 can comprise means for initializing, during a boot process of a processing system, a portion of one or more memory modules as system management random access memory (SMRAM) for system management mode (SMM) usage; means for generating an SMM component in the SMRAM, the SMM component comprising an SMM handler routine to handle dynamic intellectual property (IP) management operations corresponding to a plurality of hardware components of the processing system; means for registering the SMM handler routine with an SMM interrupt (SMI) for identification of SMM events from an operating system (OS) of the processing system; and means for generating an SMM dispatcher in the SMRAM, the SMM dispatcher to create an instance of the SMM handler routine in the SMRAM in response to receiving an SMI from the OS during runtime of the processing system.

In Example 32, the subject matter of Example 31 can optionally include the apparatus further configured to perform the method of any one of the Examples 12 to 16.

Example 33 is at least one machine readable medium comprising a plurality of instructions that in response to being executed on a computing device, cause the computing device to carry out a method according to any one of Examples 11-16. Example 34 is an apparatus for facilitating a phased boot process to dynamically initialize devices in a verified environment, configured to perform the method of any one of Examples 11-16. Example 35 is an apparatus for facilitating a phased boot process to dynamically initialize devices in a verified environment comprising means for performing the method of any one of claims 11 to 16. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium (e.g., non-transitory computer-readable storage medium) having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A processing system comprising:
a plurality of hardware components;
one or more memory modules; and
a memory device communicably coupled to the plurality of hardware components and the one or more memory modules, the memory device to store hardware initialization firmware to cause the processing system to:
initialize, during a boot process of the processing system, a portion of the one or more memory modules as system management random access memory (SMRAM) for system management mode (SMM) usage;
generate an SMM component in the SMRAM, the SMM component comprising an SMM handler routine to handle dynamic intellectual property (IP) management operations corresponding to the plurality of hardware components;
register the SMM handler routine with an SMM interrupt (SMI) for identification of SMM events from an operating system (OS) of the processing system;
receive the SMI at the SMM component from a trusted execution environment (TEE) driver of the OS, wherein the TEE driver is to generate the SMI; and
generate an SMM dispatcher in the SMRAM, the SMM dispatcher to create an instance of the SMM handler routine in the SMRAM in response to receiving the SMI from the TEE driver during runtime of the processing system;
wherein, in response to receiving the SMI at the SMM component from the TEE driver, the SMM handler routine is to at least one of enable or disable an IP of one of the plurality of hardware components during the runtime of the processing system.

2. The processing system of claim 1, wherein the hardware initialization firmware comprises Basic Input/Output System code.

3. The processing system of claim 1, wherein the hardware initialization firmware comprises Unified Extensible Firmware Interface code.

4. The processing system of claim 1, wherein the SMM handler routine is to perform communication with the one of the plurality of hardware components to enable or disable the IP using a side band interface (SBI) command.

5. The processing system of claim 1, wherein the SMM component comprises a plurality of SMM handler routines each corresponding to a hardware component of the plurality of hardware components of the processing system.

6. The processing system of claim 1, wherein components of the OS are divided into a TEE and a rest of the execution environment (REE), and wherein an application executing in the REE initiates an event to cause the SMI to be generated by the TEE driver.

7. The processing system of claim 6, wherein an application driver in the REE communicates a request corresponding to the event with the TEE driver using a TEE application programming interface (API).

8. The processing system of claim 7, wherein the TEE driver verifies the request using a trusted protocol of the TEE.

9. A method comprising:
initializing, during a boot process of a processing system, a portion of one or more memory modules as system management random access memory (SMRAM) for system management mode (SMM) usage;
generating an SMM component in the SMRAM, the SMM component comprising an SMM handler routine to handle dynamic intellectual property (IP) management operations corresponding to a plurality of hardware components of the processing system;
registering the SMM handler routine with an SMM interrupt (SMI) for identification of SMM events from an operating system (OS) of the processing system;
receiving the SMI at the SMM component from a trusted execution environment (TEE) driver of the OS, wherein the TEE driver is to generate the SMI; and
generating an SMM dispatcher in the SMRAM, the SMM dispatcher to create an instance of the SMM handler routine in the SMRAM in response to receiving the SMI from the TEE driver during runtime of the processing system;
wherein, in response to receiving the SMI at the SMM component from the TEE driver, the SMM handler routine is to at least one of enable or disable an IP of one of the plurality of hardware components during the runtime of the processing system.

10. The method of claim 9, wherein the SMM handler routine is to perform communication with the one of the plurality of hardware components to enable or disable the IP using a side band interface (SBI) command.

11. The method of claim 9, wherein the SMM component comprises a plurality of SMM handler routines each corresponding to a hardware component of the plurality of hardware components of the processing system.

12. The method of claim 9, wherein components of the OS are divided into a TEE and a rest of the execution environment (REE), and wherein an application executing in the REE initiates an event to cause the SMI to be generated by the TEE driver.

13. The method of claim 12, wherein an application driver in the REE communicates a request corresponding to the event with the TEE driver using a TEE application programming interface (API).

14. The method of claim 13, wherein the TEE driver verifies the request using a trusted protocol of the TEE.

15. A non-transitory computer-readable storage medium having stored thereon executable computer program instructions that, when executed by one or more processors, cause the one or more processors to perform operations comprising:
initializing, during a boot process of a processing system comprising the one or more processors, a portion of one or more memory modules as system management random access memory (SMRAM) for system management mode (SMM) usage;
generating an SMM component in the SMRAM, the SMM component comprising an SMM handler routine to handle dynamic intellectual property (IP) management operations corresponding to a plurality of hardware components of the processing system;
registering the SMM handler routine with an SMM interrupt (SMI) for identification of SMM events from an operating system (OS) of the processing system;
receiving the SMI at the SMM component from a trusted execution environment (TEE) driver of the OS, wherein the TEE driver is to generate the SMI; and
generating an SMM dispatcher in the SMRAM, the SMM dispatcher to create an instance of the SMM handler routine in the SMRAM in response to receiving the SMI from the TEE driver during runtime of the processing system;
wherein, in response to receiving the SMI at the SMM component from the TEE driver, the SMM handler routine is to at least one of enable or disable an IP of one of the plurality of hardware components during the runtime of the processing system.

16. The non-transitory computer-readable storage medium of claim 15, wherein the SMM handler routine is to perform communication with the one of the plurality of hardware components to enable or disable the IP using a side band interface (SBI) command.

17. The non-transitory computer-readable storage medium of claim 15, wherein the SMM component comprises a plurality of SMM handler routines each corresponding to a hardware component of the plurality of hardware components of the processing system.

18. The non-transitory computer-readable storage medium of claim 15, wherein components of the OS are divided into a TEE and a rest of the execution environment (REE), and wherein an application executing in a REE initiates an event to cause the SMI to be generated by the TEE driver.

19. The non-transitory computer-readable storage medium of claim 18, wherein an application driver in the REE communicates a request corresponding to the event with the TEE driver using a TEE application programming interface (API).

* * * * *